US012761668B2

(12) United States Patent
Sodhi et al.

(10) Patent No.: US 12,761,668 B2
(45) Date of Patent: Oct. 13, 2026

(54) OPTIMIZING ITEMS PICKUP FOR DRONES

(71) Applicant: International Business Machines Corporation, Armonk, NY (US)

(72) Inventors: Manjit Singh Sodhi, Bangalore (IN); Hina Sharma, Pune (IN); Mohamed Jawahar Hussain, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 24 days.

(21) Appl. No.: 19/009,237

(22) Filed: Jan. 3, 2025

(65) Prior Publication Data

US 2026/0194912 A1 Jul. 9, 2026

(51) Int. Cl.
*G05D 1/644* (2024.01)
*G05D 1/698* (2024.01)
*G05D 105/28* (2024.01)

(52) U.S. Cl.
CPC ............. *G05D 1/644* (2024.01); *G05D 1/698* (2024.01); *G05D 2105/28* (2024.01)

(58) Field of Classification Search
CPC ..... G05D 1/644; G05D 1/698; G05D 2105/28
USPC ............................................................ 701/25
See application file for complete search history.

(56) References Cited

U.S. PATENT DOCUMENTS 10,380,875 B1 * 8/2019 Roberts .................... G08B 7/06
10,748,107 B2 8/2020 Stoman
2015/0370251 A1 * 12/2015 Siegel ....................... B64D 1/22 701/2
2018/0025044 A1 * 1/2018 Hostetter ............... G06Q 50/26 707/690
2020/0388167 A1 * 12/2020 Chase ..................... B64D 43/00
2021/0302955 A1 * 9/2021 Ponda .................. G05D 1/0022
2021/0319394 A1 * 10/2021 Tazume ............. G06Q 10/0832
2022/0067612 A1 * 3/2022 Lee .................. G06Q 10/06315
2024/0161636 A1 5/2024 Kimchi et al.
2026/0056551 A1 * 2/2026 Jenkins .................. G05D 1/644

OTHER PUBLICATIONS

Athira et al., "ACO-DTSP Algorithm: Optimizing UAV Swarm Routes with Workload Constraints" Procedia Computer Science 235, (2024), pp. 163-172.
Zhou et al., "Research on Path Optimization of Vehicle-Drone Joint Distribution Considering Customer Priority" Complexity vol. 2024, Article ID 4933311, Jan. 10, 2024, 17 pages.

(Continued)

*Primary Examiner* — Hossam M El Abd Latif
(74) *Attorney, Agent, or Firm* — Yee & Associates, P.C.

(57) ABSTRACT

A computer-implemented method for managing drones is provided. A processor set selects a drone for completing a transportation task. The processor set receives an origin and a destination for the drone. The drone is designed to receive a number of cargos at the origin and deliver the number of cargos to the destination for completing the transportation task. The processor set determines a number of routes for the drone based on flight condition between the origin and the destination. The processor set selects a route from the number of routes for the drone based on costs associated with the number of routes. The processor set navigates the drone to complete pickup and delivery for the number of cargos according to the selected route in real-time.

20 Claims, 7 Drawing Sheets

(56) References Cited

OTHER PUBLICATIONS

Author unknown, "Drones in Natural Calamity Management," IndoWings Blog, 2024, 6 pages, indowings.com, accessed Oct. 11, 2024, https://www.indowings.com/blog/drones-in-natural-calamity-management.php.
Deshpande et al., "Drone Delivery Optimization," Arxiv, Nov. 29, 2023, 8 pages, arxiv.org, accessed Oct. 11, 2024, https://arxiv.org/abs/2311.17375.
Sunol, "The Role of Drones in Logistics in the Next 5 Years," Cyzerg, Dec. 8, 2022, 16 pages, cyzerg.com, accessed Oct. 11, 2024, https://cyzerg.com/blog/how-drones-will-affect-the-logistics-industry-in-the-next-5-years/.

* cited by examiner

OPTIMIZING ITEMS PICKUP FOR DRONES

BACKGROUND

The disclosure relates generally to optimizing items pick up for drones.

A drone is an unmanned aerial vehicle (UAV) that is remote-controlled or autonomous flying device equipped with cameras, sensors, or other sensor devices. Drones have rapidly expanded into various industries due to advancements in technology and becoming essential tools in various industries. For example, in agriculture, drones enable precision farming by capturing aerial images to monitor crop health, assess soil conditions, and even apply pesticides more efficiently. In another example, the construction industry uses drones for surveying sites, monitoring project progress, and inspecting infrastructure in areas that are hard to reach, thereby reducing costs and improving safety.

In yet another example, the media and entertainment industry employ drones for dynamic aerial photography and videography, therefore creating engaging content for films, sports, and marketing. In addition, drones also play a crucial role in public safety and disaster response, where the drones assist in search and rescue, assess damage post-disasters, and deliver emergency supplies. Further, drones can collect data on wildlife, forest health, and pollution levels to support conservation efforts in the field of environmental monitoring.

SUMMARY

According to one illustrative embodiment, a computer-implemented method for managing drones is provided. A processor set selects a drone for completing a transportation task. The processor set receives an origin and a destination for the drone. The drone is designed to receive a number of cargos at the origin and deliver the number of cargos to the destination for completing the transportation task. The processor set determines a number of routes for the drone based on flight condition between the origin and the destination. The processor set selects a route from the number of routes for the drone based on costs associated with the number of routes in real-time. The processor set navigates the drone to complete pickup and delivery for the number of cargos according to the selected route. According to other illustrative embodiments, a computer system, and a computer program product for managing drones are provided.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one or more storage media (also called "mediums") collectively included in a set of one or more storage devices that collectively include machine readable code corresponding to instructions and/or data for performing computer operations specified in a given CPP claim. A "storage device" is any tangible device that can retain and store instructions for use by a computer processor. Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation, or garbage collection, but this does not render the storage device as transitory because the data is not transitory while it is stored.

Figure 1:
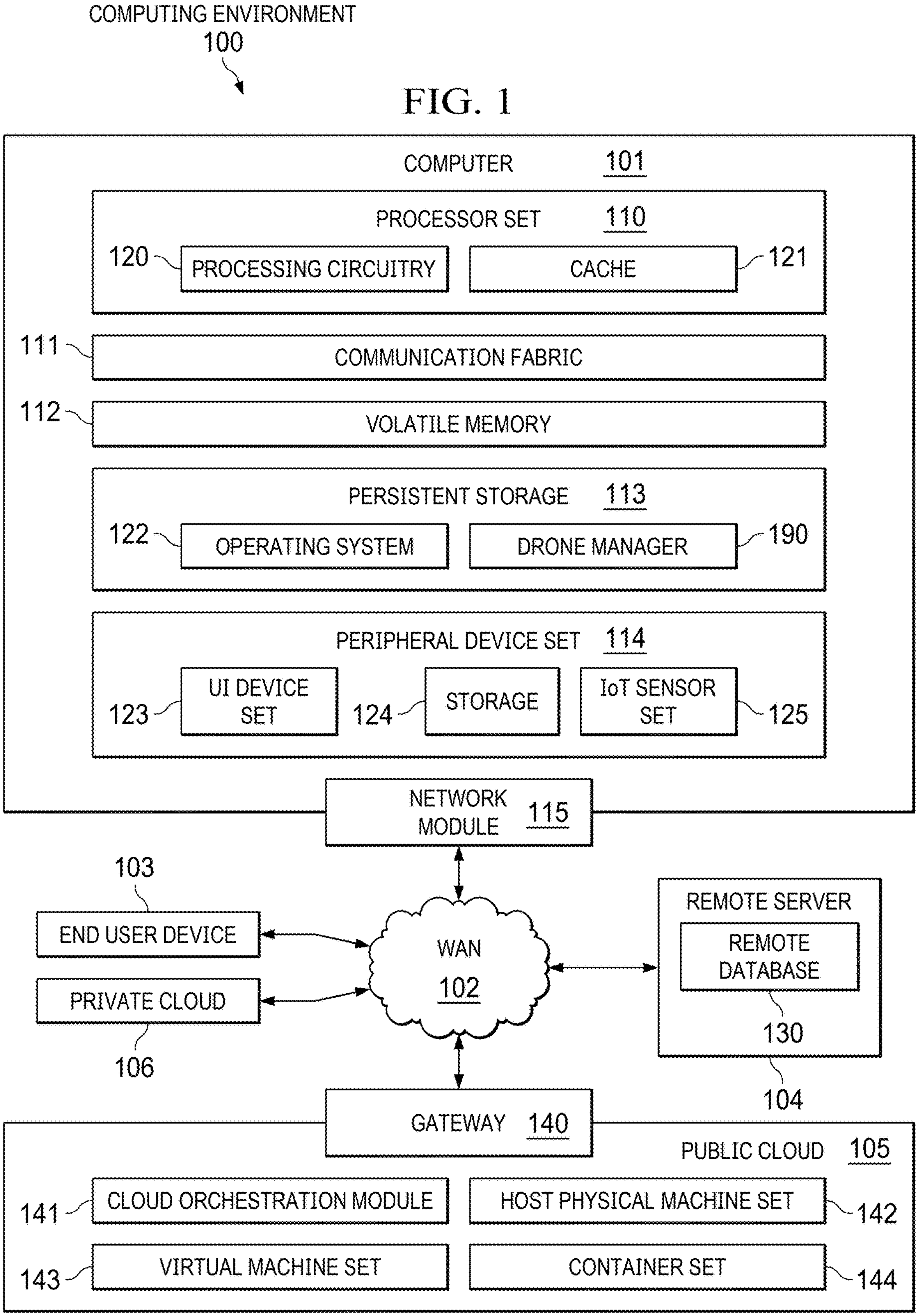
FIG. 1 is a pictorial representation of a computing environment in which illustrative embodiments may be implemented.

With reference now to the figures, and in particular with reference to FIG. 1, a block diagram of a computing environment is depicted in accordance with an illustrative embodiment. Computing environment 100 contains an example of an environment for the execution of at least some of the computer code involved in performing the inventive methods, such as drone manager 190. In addition to drone manager 190, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry

120 and cache 121), communication fabric 111, volatile memory 112, persistent storage 113 (including operating system 122 and drone manager 190, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one or more computer processors of any type now known or to be developed in the future. Processing circuitry 120 may be distributed over multiple packages, for example, multiple coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions and associated data are accessed by processor set 110 to control and direct performance of the inventive methods. In computing environment 100, at least some of the instructions for performing the inventive methods may be stored in drone manager 190 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, volatile memory 112 is located in a single package and is internal to computer 101, but, alternatively or additionally, volatile memory 112 may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in drone manager 190 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as a thin client, heavy client, mainframe computer, desktop computer, and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data application portability between the multiple constituent clouds. In this embodiment, public cloud 105 and private cloud 106 are both part of a larger hybrid cloud.

CLOUD COMPUTING SERVICES AND/OR MICROSERVICES: Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to an "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

The illustrative embodiments recognize and take into account one or more different considerations as described herein. For example, the illustrative embodiments recognize and take into account that safeguarding valuables during natural disasters or conflicts presents significant hurdles and risks. The illustrative embodiments recognize and take into account that catastrophic events can trigger widespread destruction of infrastructure, displacement of populations, and chaos. Therefore, the proception and preservation of valuable possessions become paramount concerns.

The illustrative embodiments also recognize and take into account that lack of secure storage options and the pressing need to prioritize personal safety during catastrophic event make it difficult to safeguard valuables. The illustrative embodiments also recognize and take into account that individuals are often forced to abandon their possessions during chaotic evacuations. The illustrative embodiments also recognize and take into account that drones can offer innovative solutions for rapid, contactless pickup as well as deliveries even in remote or congested areas.

Thus, illustrative embodiments of the present invention provide a computer implemented method, computer system, and computer program product for managing drones. A processor set selects a drone for completing a transportation task. The processor set receives an origin and a destination for the drone. The drone is designed to receive a number of cargos at the origin and deliver the number of cargos to the destination for completing the transportation task. The processor set determines a number of routes for the drone based on flight condition between the origin and the destination. The processor set selects a route from the number of routes for the drone based on costs associated with the number of routes. The processor set navigates the drone to complete pickup and delivery for the number of cargos according to the selected route in real-time.

Figure 2:
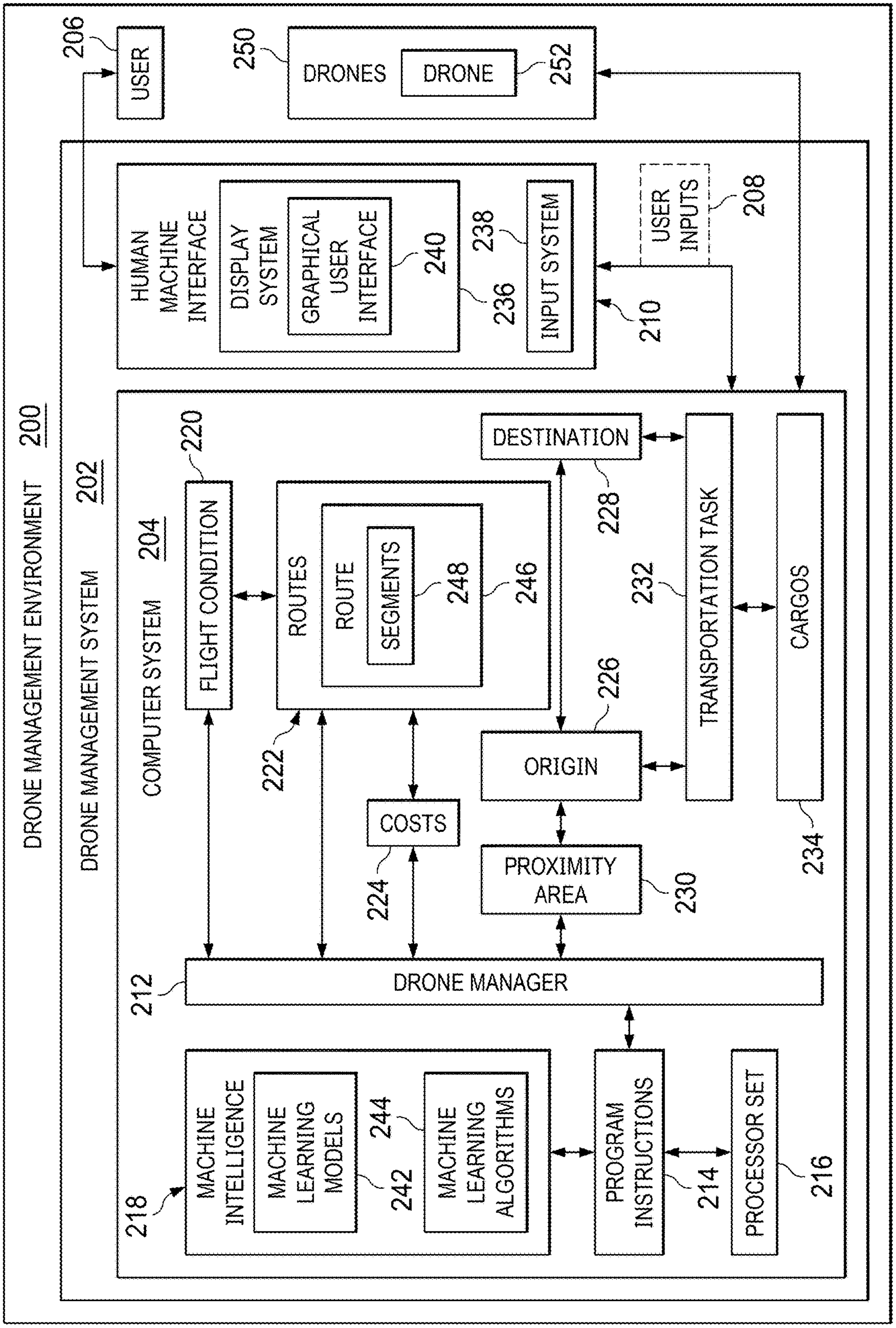
FIG. 2 is an illustration of a block diagram of a drone management environment in accordance with an illustrative embodiment.

With reference now to FIG. 2, an illustration of a block diagram of a drone management environment is depicted in accordance with an illustrative embodiment. In this illustrative example, drone management environment 200 includes components that can be implemented in hardware such as the hardware shown in computing environment 100 in FIG. 1.

In this illustrative example, drone management system 202 in drone management environment 200 can be used to navigate drones 250 for completing transportation task 232. In this illustrative example, drone management system 202 includes computer system 204 which includes drone manager 212. Drone manager 212 is located in computer system 204. Drone manager 212 may be implemented using drone manager 190 in FIG. 1.

Drone manager 212 can be implemented in software, hardware, firmware, or a combination thereof. When software is used, the operations performed by drone manager 212 can be implemented in program instructions configured to run on hardware, such as a processor unit. When firmware is used, the operations performed by drone manager 212 can be implemented in program instructions and data and stored in persistent memory to run on a processor unit. When hardware is employed, the hardware can include circuits that operate to perform the operations in drone manager 212.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

As used herein, "a number of" when used with reference to items, means one or more items. For example, "a number of operations" is one or more operations.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C," may include item A, item A and item B, or item B. This example also may include item A, item B, and item C, or item B and item C. Of course, any combination of these items can be present. In some illustrative examples, "at least one of" can be, for example, without limitation, two of item A; one of item B; and ten of item C; four of item B and seven of item C; or other suitable combinations.

Computer system 204 is a physical hardware system and includes one or more data processing systems. When more than one data processing system is present in computer system 204, those data processing systems are in communication with each other using a communications medium. The communications medium can be a network. The data processing systems can be selected from at least one of a computer, a server computer, a tablet computer, or some other suitable data processing system.

As depicted, computer system 204 includes processor set 216 that is capable of executing program instructions 214 implementing processes in the illustrative examples. In other words, program instructions 214 are computer-readable program instructions.

As used herein, a processor unit in processor set 216 is a hardware device and is comprised of hardware circuits such as those on an integrated circuit that respond to and process instructions and program code that operate a computer. A processor unit can be implemented using processor set 110 in FIG. 1. When processor set 216 executes program instructions 214 for a process, processor set 216 can be one or more processor units that are in the same computer or in different computers. In other words, the process can be distributed between processor set 216 on the same or different computers in computer system 204.

Further, processor set 216 can be of the same type or different types of processor units. For example, processor set 216 can be selected from at least one of a single core processor, a dual-core processor, a multi-processor core, a general-purpose central processing unit (CPU), a graphics processing unit (GPU), a digital signal processor (DSP), or some other type of processor unit.

As depicted, computer system 204 includes machine intelligence 218. Machine intelligence 218 can include machine learning models 242 and machine learning algorithms 244. Machine learning models 242 is a branch of artificial intelligence (AI) that enables computers to detect patterns and improve performance without direct programming commands. Rather than relying on direct input commands to complete a task, machine learning models 242 relies on input data. The data is fed into the machine, one of machine learning algorithms 244 is selected, parameters for the data are configured, and the machine is instructed to find patterns in the input data through optimization algorithms. The data model formed from analyzing the data is then used to predict future values.

Machine intelligence 218 is continuously refined over time through trial and error. Equivalence of assets or products can be effectively performed by supervised machine learning so that products or assets that do not match descriptively can nevertheless be matched. Over time, the data model from machine learning can provide a greater degree of flexibility in matching machine intelligence 218.

Machine intelligence 218 can be implemented using one or more systems such as an artificial intelligence system, a neural network, a generative neural network, a Bayesian network, an expert system, a fuzzy logic system, a genetic algorithm, or other suitable types of systems. Machine learning models 242 and machine learning algorithms 244 may make computer system 204 a special purpose computer for managing drones for completing transportation tasks.

Machine learning models 242 involves using machine learning algorithms 244 to build computation models based on samples of data. The samples of data used for training are referred to as training data or training datasets. Machine intelligence 218 can make predictions without being explicitly programmed to make these predictions. Machine intelligence 218 can be used for training and retraining computation models for a number of different types of applications. These applications include, for example, medicine, financial services, healthcare, speech recognition, computer vision, or other types of applications.

In this illustrative example, machine learning algorithms 244 can include supervised machine learning algorithms and unsupervised machine learning algorithms. Supervised machine learning can train machine learning models using data containing both the inputs and desired outputs. Examples of machine learning algorithms include XGBoost, K-means clustering, and random forest. In addition, machine learning algorithms 244 can also include semi-supervised learning which necessitates human involvement for input validations.

As depicted, drone manager 212 can identify drones 250 for completing transportation task 232. In this illustrative example, transportation task 232 involves picking up cargos 234 at origin 226 and delivering cargos 234 to destination 228 for storage. Cargos 234 can include items such as government documentations such as passports and identifications and valuable goods such as cash, fine art, jewelry, or high-end electronics.

In this illustrative example, transportation task 232 can be initiated by a user such as user 206. For example, the user can initiate transportation task 232 according to the preference of the user or in response to a calamity such as earthquakes, floods, hurricanes, tsunamis, wildfires, or any suitable catastrophic events. In this example, transportation task 232 can be initiated in response to receiving an alert associated with an imminent calamity.

In this illustrative example, the alert associated with an imminent calamity can be received directly from registered users or from the responsible authority such as the meteorological station. Calamities can be specific to a particular registered user such as a fire incident, or it could be specific to a geography. Drone manager 212 will contact the registered user in either situation to validate the situation. The registered user can request drone dispatch to be put on hold until a specific time period. As a result, a drone of appropriate capability to accommodate the package size will be reserved.

In this illustrative example, safeguarding valuables during natural disasters or conflicts presents significant hurdles and risks. These catastrophic events can trigger widespread of infrastructure, displacement of populations, and chaos. Therefore, the protection and preservation of valuable possessions become paramount concerns.

For example, floods can inundate homes, causing irreparable damage to personal belongings, treasured mementos, and critical documents. In war-torn regions, looting and destruction are prevalent such that valuable possessions are at an elevated risk of theft or damage. The lack of secure storage options and the pressing need to prioritize personal safety often make it difficult to safeguard valuables. Moreover, during chaotic evacuations, individuals are forced to abandon their possessions, leading to the loss of sentimental and valuable items.

In this illustrative example, drone manager 212 can perform a number of tasks in parallel for efficiency. For example, drone manager 212 can perform validation of the alert to ensure that the calamity is imminent while contacting the user to collect information regarding the items to be picked up. In this illustrative example, drone manager 212 can also identify drones for completing transportation task 232 while performing other tasks.

In this illustrative example, drone manager 212 identifies drone 252 from drones 250 for completing transportation task 232. Drone 252 can be identified in a number of ways. For example, drone manager 212 can identify whether any drone is present within proximity area 230 for origin 226. In this illustrative example, proximity area 230 is a defined space or region surrounding a particular point such as origin 226. If no drone can be identified within proximity area 230, drone manager 212 can expand proximity area 230 to cover bigger regions until a number of drones such as drones 250 can be identified for completing transportation task 232.

On the other hand, if a number of drones such as drones 250 can be identified within proximity area 230, drone manager 212 can select drone 252 from drones 250 for completing transportation task 232. Drone 252 can be selected from drones 250 in a number of ways. For example, drone 252 can be selected from drones 250 based on distance between each drone in drones 250 and origin 226. In this illustrative example, drone 252 can be selected as the drone that is closest to origin 226.

In this illustrative example, drone manager 212 can determine a number of routes 222 between origin 226 and destination 228 for drone 252 to complete transportation task 232. In this illustrative example, each route in routes 222 can be divided into a number of segments based on flight condition 220 between origin 226 and destination 228. Flight condition 220 is a set of environmental, operational, and performance factors that describe state of drone 252 during flight. For example, flight condition 220 can include weather, atmospheric pressure, turbulence, icing conditions, flight rules, or any suitable information. For example, instead of flying straight from origin 226 and destination 228, drone 252 may have to divert and change course in between origin 226 and destination 228 in order to avoid thunderstorms or hail.

In this illustrative example, drone manager 212 can select a route from routes 222 for delivering cargos 234 to destination 228. The route can be selected in a number of ways. For example, drone manager 212 can calculate distance for each route by summing distance calculated for each segment included in each route. Distance of each segment in each route can be calculated based on longitude and latitude for origins and destinations of each segment. In this illustrative example, distance of each segment for each route from routes 222 can be determined using the following equation:

$$\text{Distance of segment} = \text{Sin}\left(\frac{lat1}{\text{rad}}\right)\times\text{Sin}\left(\frac{lat2}{\text{rad}}\right)+\text{Cos}\left(\frac{lat1}{\text{rad}}\right)\times\text{Cos}\left(\frac{lat2}{\text{rad}}\right)\times\text{Cos}\left(\frac{long1}{\text{rad}}-\frac{long2}{\text{rad}}\right)$$

Where lat1 and long1 are latitude and longitude for origin of each segment; lat2 and long2 are latitude and longitude for destination of each segment, and rad is a measure for angles, which equals to 180°/π.

As depicted, the distance of each route can be determined by summing distances of all segments using the equation shown above. In this illustrative example, drone manager 212 can determine costs 224 for routes 222 for selecting a route for drone 252 to complete transportation task 232. Costs 224 can be determined using a variety of factors, for example, costs 224 can be determined based on energy consumption, maintenance costs, route length, travel time, load weight, load utilization, or any suitable factors. In this illustrative example, drone manager 212 can select route 246 from routes 222 for drone 252 for completing transportation task 232. Route 246 includes segments 248 that can be used for determining distance and cost for route 246. In this illustrative example, route 246 can be the route with lowest cost among all routes in routes 222. As a result, drone manager 212 can navigate drone 252 in real-time to pick up cargos 234 for user 206 at origin 226 and deliver cargos 234 to destination 228 for storage.

In an alternative example, drone manager 212 can also utilize machine learning models 242 for selecting drone 252 and route 246 for completing transportation task 232. In this illustrative example, machine learning models 242 can be continuously trained using historical data of drones completing transportation task 232. As a result, machine learning models 242 can be used for identifying optimal drones and routes for completing transportation tasks efficiently.

In this illustrative example, user 206 can interact with computer system 204 via user inputs 208. User inputs 208 can be generated by user 206 using human machine interface (HMI) 210. As depicted, human machine interface 210 includes display system 236 and input system 238. Display system 236 is a physical hardware system and includes one or more display devices on which graphical user interface 240 can be displayed. The display devices can include at least one of a light emitting diode (LED) display, an organic light emitting diode (OLED) display, a computer monitor, a projector, a flat panel display, a heads-up display (HUD), a head-mounted display (HMD), smart glasses, augmented reality glasses, virtual reality headsets, or some other suitable device that can output information for the visual presentation of information.

In this example, user 206 is a person that can interact with graphical user interface 240 through user inputs 208 generated by input system 238. For example, user inputs 208 can include initiation of transportation task 232, input of items to be included in cargos 234, and information associated with origin 226. Input system 238 is a physical hardware system and can be selected from at least one of a mouse, a keyboard, a touch pad, a trackball, a touchscreen, a stylus, a motion sensing input device, a gesture detection device, a data glove, a cyber glove, a haptic feedback device, or some other suitable type of input device. In this illustrative example, users 206 can view routes 222, flight condition 220, proximity area 230, locations for drone 252, or any suitable information through graphical user interface 240.

In this illustrative example, user 206 can register for services provided by drone manager 212 and input items to be included in cargos 234 for pickup using input system 238. In this illustrative example, drone manager 212 can perform validations on identity of user 206 and items inputted by user 206. For example, user 206 can be validated based on address for user 206 and longitude and latitude of origin 226 for picking up cargos 234. Subsequently, drone manager 212 can register user 206 and items inputted by user 206 after validation.

In one illustrative example, user 206 registers with drone manager 212 to opt for drone service for package collection during the time of calamity. As part of the registration process, the customer will declare the items to be included in cargos 234. These items could range from government documentation to valuable goods. Once the items are validated and approved, drone manager 212 will evaluate the validity of user 206. In this illustrative example, a key aspect of the evaluation is the address of the customer and the latitude and longitude of the location from where the drone should pick up the valuables.

In one illustrative example, one or more solutions are present that overcome a problem with optimizing drone performance for completing transportation tasks. As a result, one or more technical solutions may provide an ability to increase the efficiency for managing drones for completing transportation tasks. In this illustrative example, transportation task 232 needs to be completed in a short time period due to the emergency situation resulted by calamities. In other words, drone manager 212 provides automation of drone management and allocation for completing transportation tasks in a short time period that cannot be done by user 206.

In the illustrative example, computer system 204 can be configured to perform at least one of the steps, operations, or actions described in the different illustrative examples using software, hardware, firmware, or a combination thereof. As a result, computer system 204 operates as a special purpose computer system in which drone manager 212 in computer system 204 enables optimization of drone performance by efficiently identifying drone and routes for completing transportation tasks. In particular, drone manager 212 transforms computer system 204 into a special purpose computer system as compared to currently available general computer systems that do not have a drone manager 212.

The illustration of drone management environment 200 in FIG. 2 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, drone 252 may not be able to pick all items included in cargos 234 such that multiple trips are required for drone 252 to deliver cargos 234 to destination 228. In this example, drone manager 212 determines a new route each time when drone 252 reaches origin 226 and destination 228. In an alternative example, multiple drones from drones 250 can be allocated for completing transportation task 232 at the same time.

Figure 3:
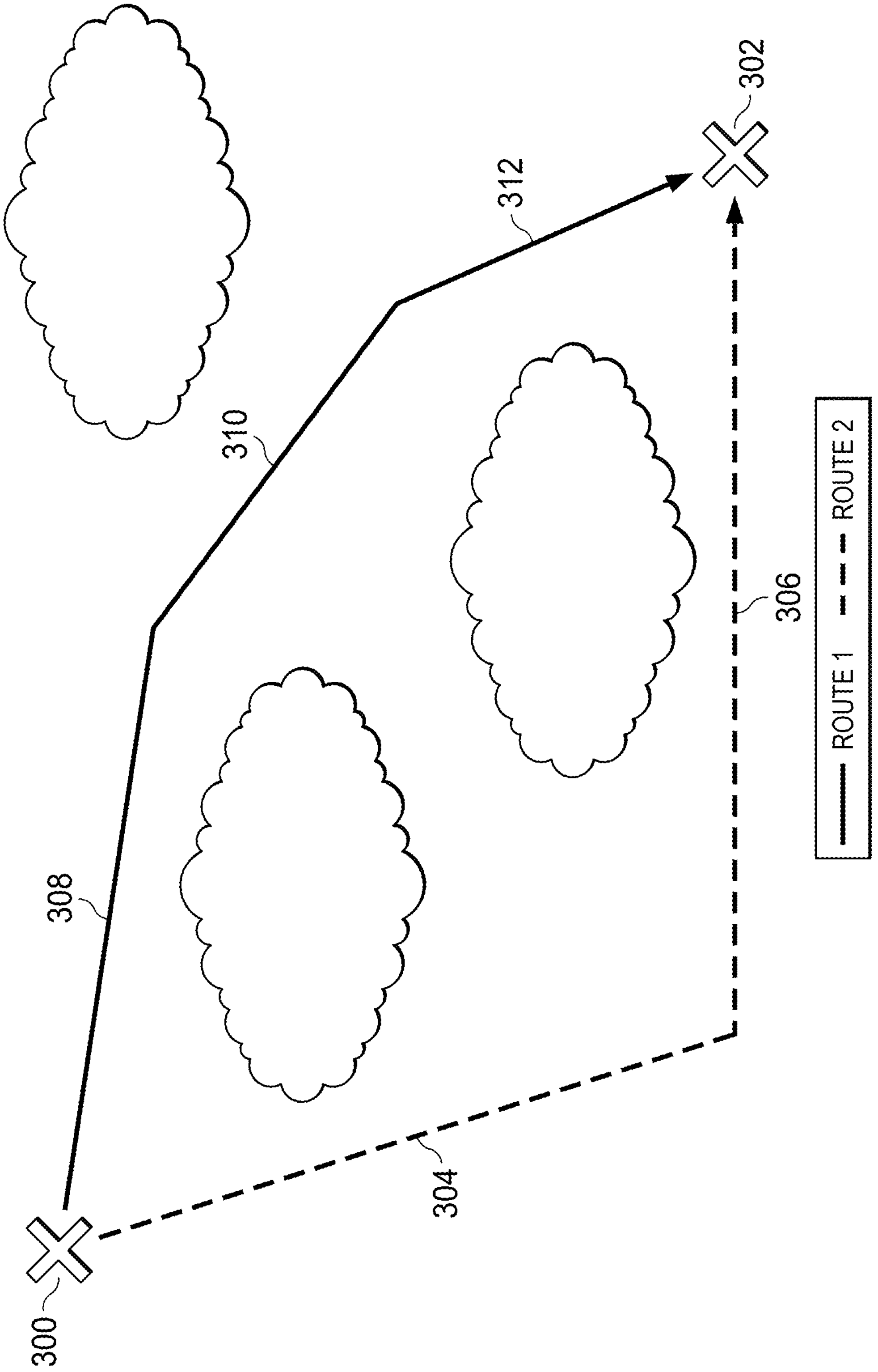
FIG. 3 is an illustration of calculating distances for different routes in accordance with an illustrative embodiment.

With reference now to FIG. 3, an illustration of calculating distances for different routes is shown in accordance with an illustrative embodiment. In this example, the process of calculating distances for different routes can be performed using drone manager 212 in computer system 204 in FIG. 2.

In FIG. 3, a drone is identified for a transportation task that includes picking up cargos at origin 300 and delivering the cargos to destination 302. In this illustrative example, origin 300 can be an example of origin 226 in FIG. 2 and destination 302 can be an example of destination 228 in FIG. 2.

As depicted in FIG. 3, flight condition is bad between origin 300 and destination 302. In this illustrative example, multiple thunderstorms are formed between origin 300 and destination 302. As a result, route 1 and route 2 are determined to complete the transportation task. In this illustrative example, route 1 and route 2 can be examples of routes 222 in FIG. 2.

In this illustrative example, route 1 can be divided into segment 308, segment 310, and segment 312. In a similar fashion, route 2 can be divided into segment 304 and segment 306. In this illustrative example, segment 304, segment 306, segment 308, segment 310, and segment 312 can be examples of segments 248 in FIG. 2.

As depicted, distance for route 1 can be calculated based on segment 308, segment 310, and segment 312 using the method described in FIG. 2. In a similar fashion, distance for route 2 can be calculated based on segment 304 and segment 306 using the method described in FIG. 2. Subsequently, costs for route 1 and route 2 can be determined based on the distances for route 1 and route 2 using the method described in FIG. 2. As a result, a route from route 1 and route 2 can be selected based on the costs determined for route 1 and route 2.

The illustration of route 1 and route 2 in FIG. 3 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, more routes can be determined between origin 300 and destination 302 and other types of flight conditions may be presented between origin 300 and destination 302.

Figure 4:
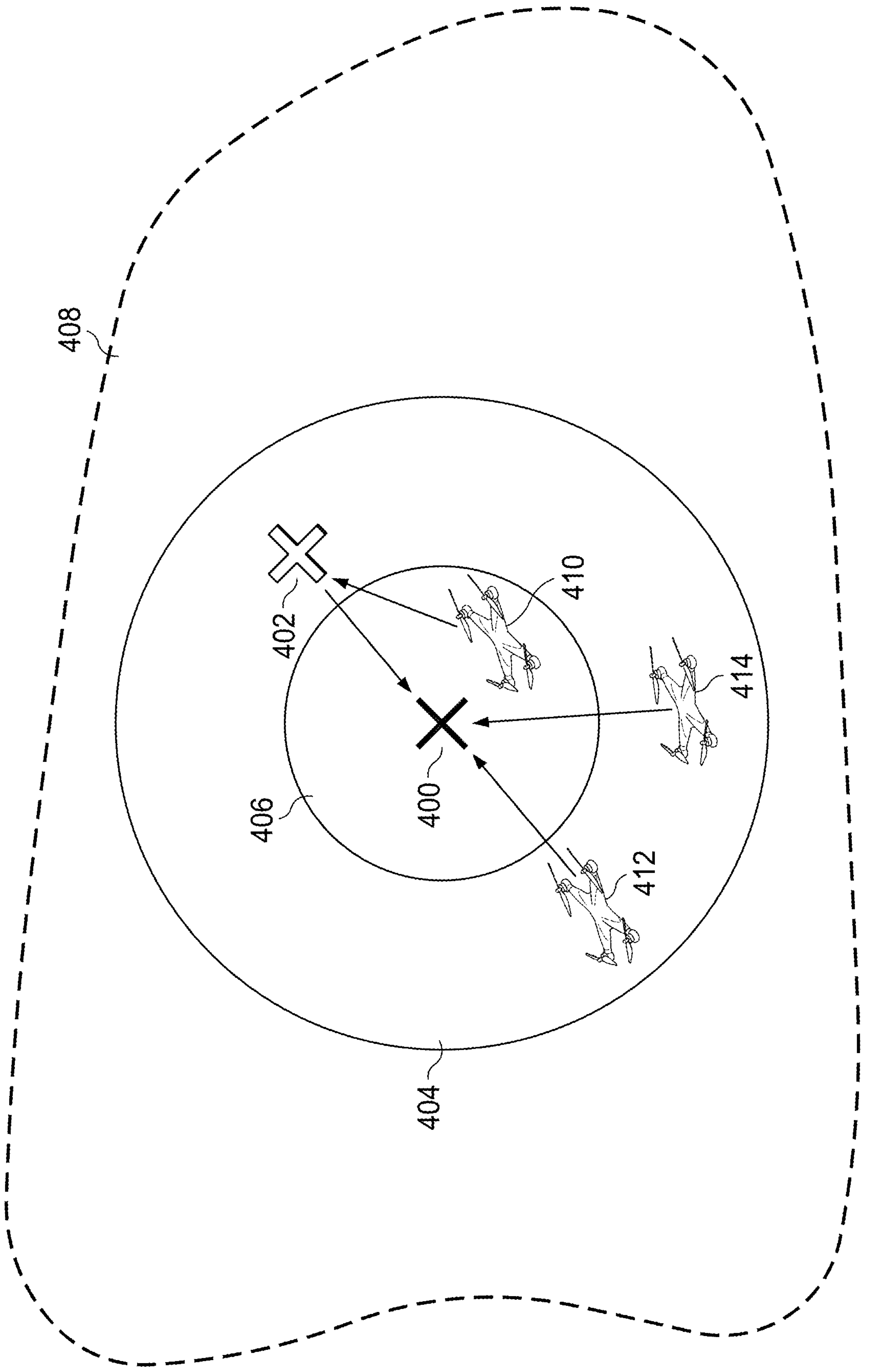
FIG. 4 is an illustration of selecting drones in accordance with an illustrative embodiment.

With reference now to FIG. 4, an illustration of selecting drones is shown in accordance with an illustrative embodiment. In this example, the process of selecting drones can be performed using drone manager 212 in computer system 204 in FIG. 2.

In FIG. 4, a drone is needed for completing a transportation task that includes picking up cargos at origin 400. In this illustrative example, origin 400 can be an example of origin 226 in FIG. 2. As depicted, drone 410, drone 412, and drone 414 are drones around origin 400.

In this illustrative example, the selection of drone for picking up cargos at origin 400 includes defining a proximity area surround origin 400. For example, proximity area 406 is initially defined for selecting a drone and drone 410 is present within proximity area 406. However, drone 410 needs to complete another transportation task by delivering cargos at destination 402 before going to pick up cargos at origin 400. In this case, the proximity area for identifying drones is expanded further includes proximity area 404 such that more drones can be identified as potential candidates for picking up cargos at origin 400. As a result, drone 412 and drone 414 are also identified within the region that covers proximity area 404 and proximity area 406. In this illustrative example, a drone among drone 410, drone 412, and drone 414 can be selected for picking up cargos at origin 400 based on their distance to origin 400.

In this illustrative example, drone selection can be based on the drone that has the capacity for the package and on the drone that can pick up the package at the earliest time. For every pickup location such as origin 400, there will be a pick-up region, and subsequent pick-up regions based on the configuration. Initially, drones within the same region will be evaluated based on lead time. The lead time is the amount of time the drone needs to complete its existing transportation task. For all the drones that have package capacity available, evaluations will be made to determine which drone is available for the quickest pick-up and such drone will be reserved and allocated for picking up cargos at origin 400.

The illustration of selecting drones in FIG. 4 is not meant to imply physical or architectural limitations to the manner in which an illustrative embodiment can be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment. For example, the region for selecting drones can be further expanded to include proximity area 408 if no other drones can be identified within the region that covers proximity area 404 and proximity area 406.

Figure 5:
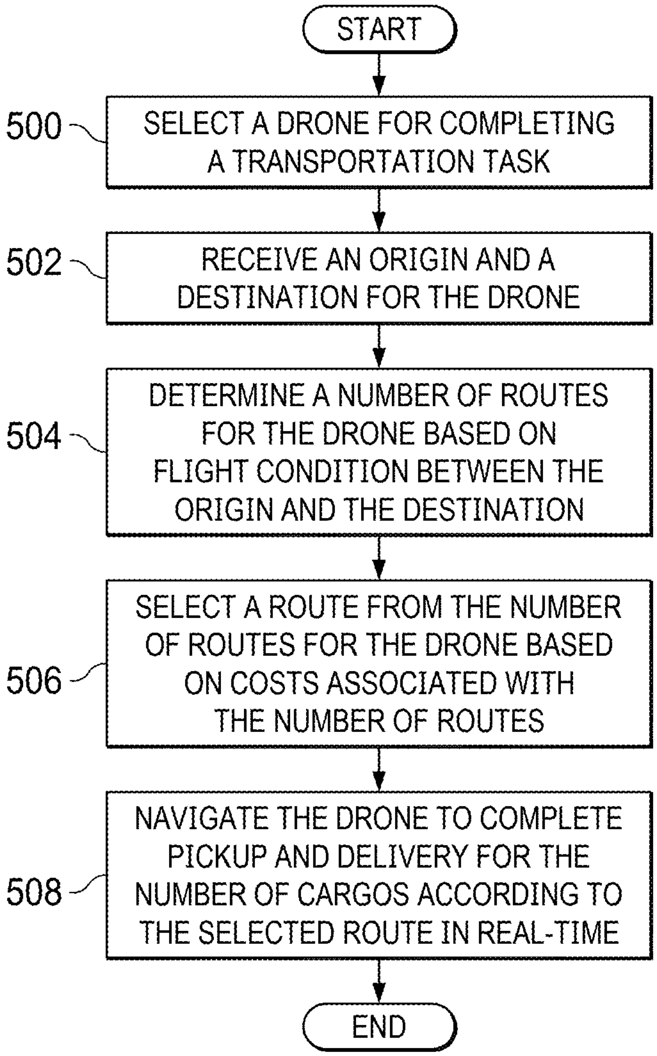
FIG. 5 is an illustration of a process for managing drones in accordance with an illustrative embodiment.

With reference now to FIG. 5, a flowchart illustrating a process for managing drones is shown in accordance with an illustrative embodiment. The process in FIG. 4 can be implemented in hardware, software, or both. When implemented in software, the process can take the form of program instructions that are run by one of more processor units located in one or more hardware devices in one or more computer systems. For example, the process can be implemented in drone manager 212 in computer system 204 in FIG. 2.

The process begins by selecting a drone for completing a transportation task (step 500). The process receives an origin and a destination for the drone (step 502). In step 502, the drone is designed to receive a number of cargos at the origin and deliver the number of cargos to the destination for completing the transportation task.

The process determines a number of routes for the drone based on flight condition between the origin and the destination (step 504). The process selects a route from the number of routes for the drone based on costs associated with the number of routes (step 506). The process navigates the drone to complete pickup and delivery for the number of cargos according to the selected route in real-time (step 508). The process terminates thereafter.

Figure 6:
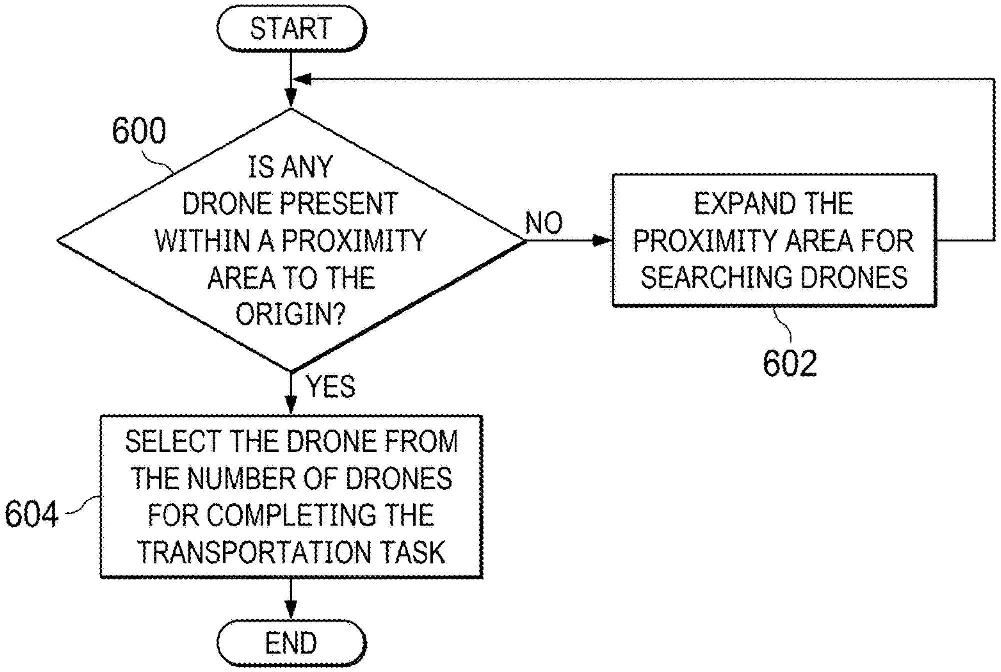
FIG. 6 is an illustration of a process for selecting the drone for completing the transportation task in accordance with an illustrative embodiment.

Turning next to FIG. 6, a flowchart of a process for selecting the drone for completing the transportation task is depicted in accordance with an illustrative embodiment. The process in this flowchart is an example of an implementation for step 500 in FIG. 5.

The process begins by determining whether any drone is present within a proximity area to the origin (step 600). If no drones are present within the proximity area to the origin, the process expands the proximity area for searching drones (step 602). The process returns to step 600 and repeats step 600 to step 602 until at least one drone can be identified the proximity area. The process proceeds to step 604 after at least one drone can be identified the proximity area. With reference again to step 600, if a number of drones is present within the proximity area to the origin, the process selects the drone from the number of drones for completing the transportation task (step 604). The process terminates thereafter.

Figure 7:
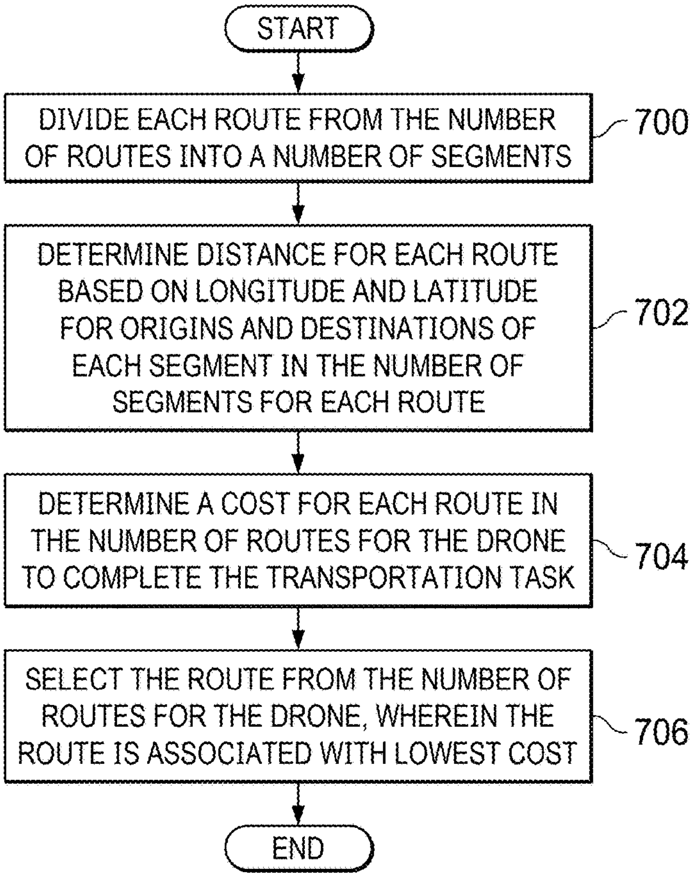
FIG. 7 is an illustration of a process for selecting the route for completing the transportation task in accordance with an illustrative embodiment.

Turning next to FIG. 7, a flowchart of a process for selecting the route for completing the transportation task is depicted in accordance with an illustrative embodiment. The process in this flowchart is an example of an implementation for step 506 in FIG. 5.

The process begins by dividing each route from the number of routes into a number of segments (step 700). The process determines distance for each route based on longitude and latitude for origins and destinations of each segment in the number of segments for each route (step 702). The process determines a cost for each route in the number of routes for the drone to complete the transportation task (step 704). The process selects the route from the number of routes for the drone, wherein the route is associated with lowest cost (step 706). The process terminates thereafter.

Figure 8:
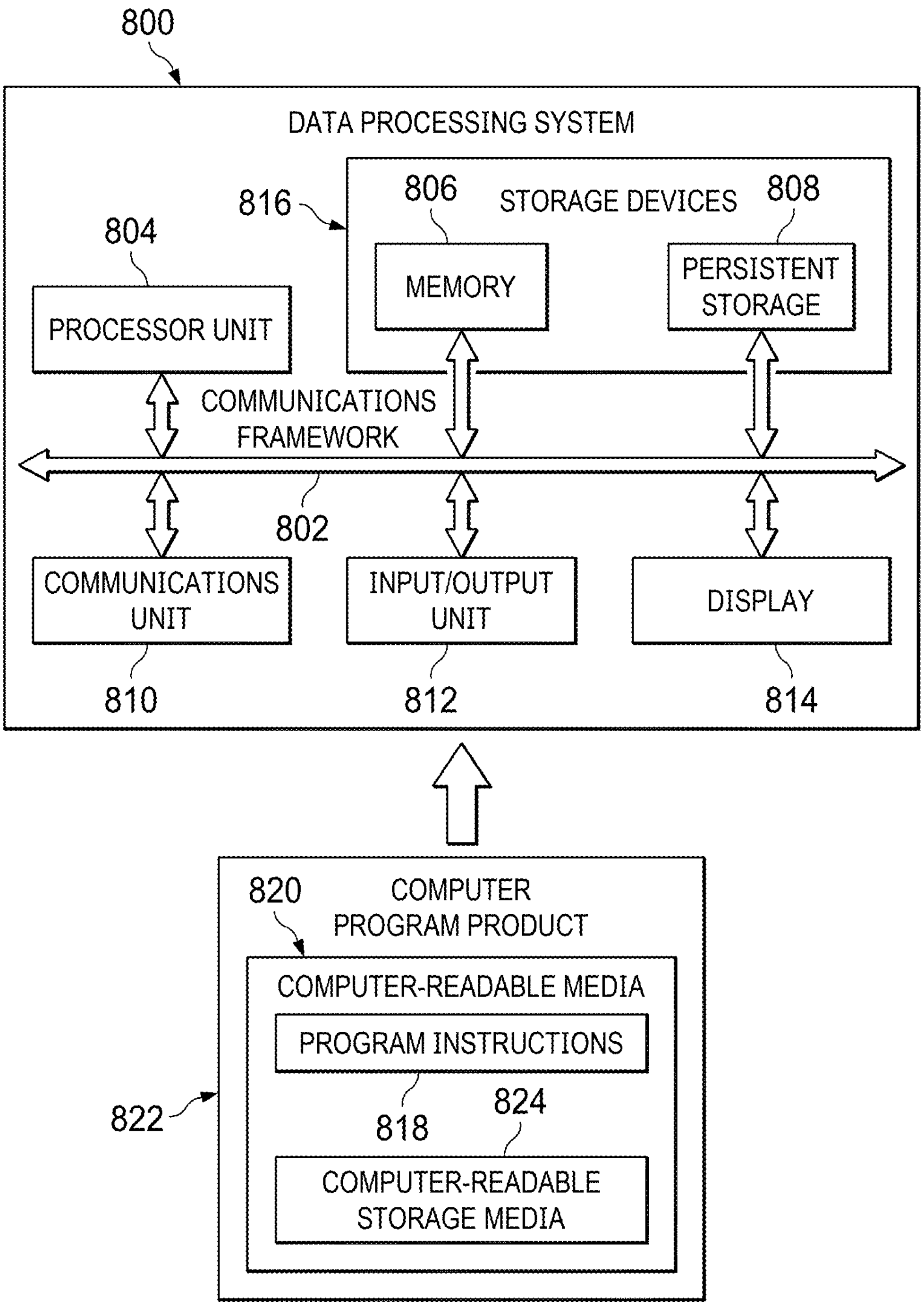
FIG. 8 is a block diagram of a data processing system in accordance with an illustrative embodiment.

Turning now to FIG. 8, a block diagram of a data processing system is depicted in accordance with an illustrative embodiment. Data processing system 800 can be used to implement computers and computing devices in computing environment 100 in FIG. 1. Data processing system 800 can also be used to implement computer system 204 in FIG. 2. In this illustrative example, data processing system 800 includes communications framework 802, which provides communications between processor unit 804, memory 806, persistent storage 808, communications unit 810, input/output (I/O) unit 812, and display 814. In this example, communications framework 802 takes the form of a bus system.

Processor unit 804 serves to execute instructions for software that can be loaded into memory 806. Processor unit 804 includes one or more processors. For example, processor unit 804 can be selected from at least one of a multicore processor, a central processing unit (CPU), a graphics processing unit (GPU), a physics processing unit (PPU), a digital signal processor (DSP), a network processor, or some other suitable type of processor. Further, processor unit 804 can be implemented using one or more heterogeneous processor systems in which a main processor is present with secondary processors on a single chip. As another illustrative example, processor unit 804 can be a symmetric multiprocessor system containing multiple processors of the same type on a single chip.

Memory 806 and persistent storage 808 are examples of storage devices 816. A storage device is any piece of hardware that is capable of storing information, such as, for example, without limitation, at least one of data, program instructions in functional form, or other suitable information either on a temporary basis, a permanent basis, or both on a temporary basis and a permanent basis. Storage devices 816 may also be referred to as computer-readable storage devices in these illustrative examples. Memory 806, in these examples, can be, for example, a random-access memory or any other suitable volatile or non-volatile storage device. Persistent storage 808 may take various forms, depending on the particular implementation.

For example, persistent storage 808 may contain one or more components or devices. For example, persistent storage 808 can be a hard drive, a solid-state drive (SSD), a flash memory, a rewritable optical disk, a rewritable magnetic tape, or some combination of the above. The media used by persistent storage 808 also can be removable. For example, a removable hard drive can be used for persistent storage 808.

Communications unit 810, in these illustrative examples, provides for communications with other data processing systems or devices. In these illustrative examples, communications unit 810 is a network interface card.

Input/output unit 812 allows for input and output of data with other devices that can be connected to data processing system 800. For example, input/output unit 812 may provide a connection for user input through at least one of a keyboard, a mouse, or some other suitable input device. Further, input/output unit 812 may send output to a printer. Display 814 provides a mechanism to display information to a user.

Instructions for at least one of the operating system, applications, or programs can be located in storage devices 816, which are in communication with processor unit 804 through communications framework 802. The processes of the different embodiments can be performed by processor unit 804 using computer-implemented instructions, which may be located in a memory, such as memory 806.

These instructions are referred to as program instructions, computer usable program instructions, or computer-readable program instructions that can be read and executed by a processor in processor unit 804. The program instructions in the different embodiments can be embodied on different physical or computer-readable storage media, such as memory 806 or persistent storage 808.

Program instructions 818 are located in a functional form on computer-readable media 820 that is selectively removable and can be loaded onto or transferred to data processing system 800 for execution by processor unit 804. Program instructions 818 and computer-readable media 820 form computer program product 822 in these illustrative examples. In the illustrative example, computer-readable media 820 is computer-readable storage media 824.

Computer-readable storage media 824 is a physical or tangible storage device used to store program instructions 818 rather than a medium that propagates or transmits program instructions 818. Computer-readable storage media 824, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program instructions 818 can be transferred to data processing system 800 using a computer-readable signal media. The computer-readable signal media are signals and can be, for example, a propagated data signal containing program instructions 818. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, “computer-readable media 820” can be singular or plural. For example, program instructions 818 can be located in computer-readable media 820 in the form of a single storage device or system. In another example, program instructions 818 can be located in computer-readable media 820 that is distributed in multiple data processing systems. In other words, some instructions in program instructions 818 can be located in one data processing system while other instructions in program instructions 818 can be located in one data processing system. For example, a portion of program instructions 818 can be located in computer-readable media 820 in a server computer while another portion of program instructions 818 can be located in computer-readable media 820 located in a set of client computers.

The different components illustrated for data processing system 800 are not meant to provide architectural limitations to the manner in which different embodiments can be implemented. In some illustrative examples, one or more of the components may be incorporated in or otherwise form a portion of another component. For example, memory 806, or portions thereof, may be incorporated in processor unit 804 in some illustrative examples. The different illustrative embodiments can be implemented in a data processing system including components in addition to or in place of those illustrated for data processing system 800. Other components shown in FIG. 8 can be varied from the illustrative examples shown. The different embodiments can be implemented using any hardware device or system capable of running program instructions 818.

Thus, illustrative embodiments of the present disclosure provide a computer-implemented method, computer system, and computer program product for managing containers. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms “includes”, “including”, “has”, “contains”, and variants thereof are used herein, such terms are intended to be inclusive in a manner similar to the term “comprises” as an open transition word without precluding any additional or other elements.

The descriptions of the various embodiments of the present invention have been presented for purposes of illustration but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A computer implemented method for managing drones, the computer implemented method comprising:

selecting, by a processor set, a drone for completing a transportation task, wherein selecting the drone comprises selecting the drone based on a lead time representing an amount of time the drone needs to complete an existing transportation task and available package capacity of the drone to accommodate a number of cargos for the transportation task;

receiving, by the processor set, an origin and a destination for the drone, wherein the drone is designed to receive a number of cargos at the origin and deliver the number of cargos to the destination for completing the transportation task;

determining, by the processor set, a number of routes for the drone based on flight conditions between the origin and the destination, wherein selecting the drone and determining the number of routes are performed concurrently with validating the transportation task and collecting information associated with the number of cargos;

selecting, by the processor set, a route from the number of routes for the drone based on costs associated with the number of routes, wherein the costs associated with the number of routes are determined based on energy consumption, maintenance costs, route length, travel time, load weight, and load utilization of the drone to complete the transportation task; and navigating, by the processor set, the drone to complete pickup and delivery for the number of cargos according to the selected route in real-time.

2. The computer implemented method of claim 1, wherein the selecting, by the processor set, the drone for completing the transportation task comprises:

determining, by the processor set, whether any drone is present within a proximity area to the origin; and in response to determining that a number of drones is present within the proximity area to the origin, selecting, by the processor set, the drone from the number of drones for completing the transportation task.

3. The computer implemented method of claim 2, further comprising:

in response to determining that no drones are present within the proximity area to the origin, expanding, by the processor set, the proximity area for searching drones.

4. The computer implemented method of claim 2, wherein the drone is selected based on distances between the origin to each drone from the number of drones.

5. The computer implemented method of claim 1, wherein the selecting, by the processor set, the route from the number of routes for the drone based on costs associated with the number of routes comprises:

dividing, by the processor set, each route from the number of routes into a number of segments;

determining, by the processor set, distance for each route based on longitude and latitude for origins and destinations of each segment in the number of segments for each route;

determining, by the processor set, a cost for each route in the number of routes for the drone to complete the transportation task; and selecting, by the processor set, the route from the number of routes for the drone, wherein the route is associated with lowest cost.

6. The computer implemented method of claim 1, wherein the transportation task is initiated by a user in response to receiving an alert for a calamity.

7. The computer implemented method of claim 6, wherein the user is validated based on address for the user and longitude and latitude of the origin for picking up the number of cargos.

8. A computer system for managing drones, comprising:

a processor set;

a set of one or more computer-readable storage media; and program instructions stored on the set of one or more storage media to cause the processor set to perform operations comprising:

selecting a drone for completing a transportation task, wherein selecting the drone comprises selecting the drone based on a lead time representing an amount of time the drone needs to complete an existing transportation task and available package capacity of the drone to accommodate a number of cargos for the transportation task;

receiving an origin and a destination for the drone, wherein the drone is designed to receive a number of cargos at the origin and deliver the number of cargos to the destination for completing the transportation task;

determining a number of routes for the drone based on flight conditions between the origin and the destination, wherein selecting the drone and determining the number of routes are performed concurrently with validating the transportation task and collecting information associated with the number of cargos;

selecting a route from the number of routes for the drone based on costs associated with the number of routes, wherein the costs associated with the number of routes are determined based on energy consumption, maintenance costs, route length, travel time, load weight, and load utilization of the drone to complete the transportation task; and navigating the drone to complete pickup and delivery for the number of cargos according to the selected route in real-time.

9. The computer system of claim 8, wherein the selecting the drone for completing the transportation task comprises:

determining whether any drone is present within a proximity area to the origin; and in response to determining that a number of drones is present within the proximity area to the origin, selecting the drone from the number of drones for completing the transportation task.

10. The computer system of claim 9, wherein the operations further comprise:

in response to determining that no drones are present within the proximity area to the origin, expanding the proximity area for searching drones.

11. The computer system of claim 8, wherein the drone is selected based on distances between the origin to each drone from the number of drones.

12. The computer system of claim 8, wherein the selecting the route from the number of routes for the drone based on costs associated with the number of routes comprises:

dividing each route from the number of routes into a number of segments;

determining distance for each route based on longitude and latitude for origins and destinations of each segment in the number of segments for each route;

determining a cost for each route in the number of routes for the drone to complete the transportation task; and selecting the route from the number of routes for the drone, wherein the route is associated with lowest cost.

13. The computer system of claim 8, wherein the transportation task is initiated by a user in response to receiving an alert for a calamity.

14. The computer system of claim 13, wherein the user is validated based on address for the user and longitude and latitude of the origin for picking up the number of cargos.

15. A computer program product, comprising:

a set of one or more computer-readable storage media;

program instructions stored in the set of one or more computer-readable storage media to perform operations comprising:

selecting, by a processor set, a drone for completing a transportation task, wherein selecting the drone comprises selecting the drone based on a lead time representing an amount of time the drone needs to complete an existing transportation task and available package capacity of the drone to accommodate a number of cargos for the transportation task;

receiving, by the processor set, an origin and a destination for the drone, wherein the drone is designed to receive a number of cargos at the origin and deliver the number of cargos to the destination for completing the transportation task;

determining, by the processor set, a number of routes for the drone based on flight conditions between the origin and the destination, wherein selecting the drone and determining the number of routes are performed concurrently with validating the transportation task and collecting information associated with the number of cargos;

selecting, by the processor set, a route from the number of routes for the drone based on costs associated with the number of routes, wherein the costs associated with the number of routes are determined based on energy consumption, maintenance costs, route length, travel time, load weight, and load utilization of the drone to complete the transportation task; and navigating, by the processor set, the drone to complete pickup and delivery for the number of cargos according to the selected route in real-time.

16. The computer program product of claim 15, wherein the selecting, by the processor set, the drone for completing the transportation task comprises:

determining, by the processor set, whether any drone is present within a proximity area to the origin; and in response to determining that a number of drones is present within the proximity area to the origin, selecting, by the processor set, the drone from the number of drones for completing the transportation task.

17. The computer program product of claim 16, wherein the operations further comprise:

in response to determining that no drones are present within the proximity area to the origin, expanding, by the processor set, the proximity area for searching drones.

18. The computer program product of claim 16, wherein the drone is selected based on distances between the origin to each drone from the number of drones.

19. The computer program product of claim 15, wherein the selecting, by the processor set, the route from the number of routes for the drone based on costs associated with the number of routes comprises:

dividing, by the processor set, each route from the number of routes into a number of segments;

determining, by the processor set, distance for each route based on longitude and latitude for origins and destinations of each segment in the number of segments for each route;

determining, by the processor set, a cost for each route in the number of routes for the drone to complete the transportation task; and selecting, by the processor set, the route from the number of routes for the drone, wherein the route is associated with lowest cost.

20. The computer program product of claim 15, wherein the transportation task is initiated by a user in response to receiving an alert for a calamity.

* * * * *